United States Patent [19]

Musha et al.

[11] 4,107,384

[45] Aug. 15, 1978

[54] METHOD FOR PRODUCING POROUS FIBERS

[75] Inventors: Morito Musha, Seto; Tokuhisa Miyamatsu, Nagoya, both of Japan

[73] Assignee: Mitsubishi Rayon Co., Ltd., Tokyo, Japan

[21] Appl. No.: 713,033

[22] Filed: Aug. 10, 1976

[51] Int. Cl.² .............................................. B29F 3/10
[52] U.S. Cl. .................................. 428/398; 264/49; 264/344; 521/63
[58] Field of Search ............... 264/221, 41, 171, 344, 264/49; 260/2.5 M; 428/398; 210/500 M

[56] References Cited

U.S. PATENT DOCUMENTS

| | | | |
|---|---|---|---|
| 411,020 | 9/1889 | Edison | 264/221 |
| 525,007 | 8/1889 | Edison | 264/221 |
| 1,713,679 | 5/1929 | Snelling | 264/186 |
| 3,188,165 | 6/1965 | Magat et al. | 8/115.5 |
| 3,190,765 | 6/1965 | Yuan | 264/216 |
| 3,882,220 | 5/1975 | Ryder | 264/221 |
| 4,012,342 | 3/1977 | Dougherty | 264/49 |

FOREIGN PATENT DOCUMENTS

| | | | |
|---|---|---|---|
| 2,103,769 | 9/1971 | Fed. Rep. of Germany | 264/221 |
| 46-24,740 | 8/1971 | Japan | 264/49 |
| 39,082 | 8/1960 | Luxembourg | 264/49 |

*Primary Examiner*—Jay H. Woo
*Attorney, Agent, or Firm*—Oblon, Fisher, Spivak, McClelland & Maier

[57] ABSTRACT

Porous fibers which are much preferred for having various functionalities such as ion exchangeability, catalytic activity, etc. can be produced by impregnating a mixed monomer liquid of at least one monovinyl monomer and at least one polyvinyl monomer which contains a polymerization initiator in substrate fibers capable of being swollen by 30 – 500 volume % with the mixed monomer liquid, polymerizing the monomers in the state of being absorbed in the fibers and then removing said substrate fibers.

13 Claims, No Drawings

METHOD FOR PRODUCING POROUS FIBERS

The present invention relates to a process for producing porous fibers comprising a monovinyl polymer cross-linked with a polyvinyl monomer.

Vinyl polymers such as styrene-divinyl copolymer in which cross linkage is introduced by copolymerization with polyvinyl monomer have been widely used as matrix for resins having various functions such as catalytic activity, redox property, electron exchangeability, ion exchangeability, chelating ability as molecular sieves, enzyme fixing ability, etc. However, the functional resins are ordinarily used in the form of particles or powders and have restrictions in their surface area and their form for fully exhibiting the functions. Therefore, fibers made from monovinyl polymers having crosslinkage have various advantages over the resins in large surface area, higher reaction (or adsorption) velocity, higher reaction efficiency, excellent liquid permeability, various uses based on the form of fibers. Since monovinyl polymers having crosslinkage cannot be spun as they are, the following methods have been employed for producing such monovinyl polymer fibers having crosslinkage.

(1) After the monovinyl polymers are spun, crosslinkage is introduced by an appropriate means.

(2) The monovinyl polymer having crosslinkage is blended with a fiber forming polymer such as polyethylene, polypropylene, etc. and the blend is spun.

However, these methods have various problems, e.g., narrow scope for selection of usable monovinyl monomer, narrow scope of control of crosslinking degree, various troubles caused by blending of components which are unnecessary for providing the functions, etc.

The object of the present invention is to provide a method for producing fibers comprising a monovinyl polymer in which crosslinkage is introduced by copolymerization with polyvinyl monomer (referred to as "crosslinked monovinyl polymer" hereinafter).

Another object of the present invention is to produce porous fibers comprising the crosslinked monovinyl polymer.

The method for producing porous fibers according to the present invention comprises impregnating 50 – 400% by weight of a mixed monomer liquid of a monovinyl monomer and a polyvinyl monomer which contains a polymerization initiator in substrate fibers capable of being swollen by 30 – 500 volume % by said mixed monomer liquid, polymerizing the monomers in the state of being absorbed in the fibers and then dissolving or decomposing said substrate fibers to remove them.

The crosslinked monovinyl polymer fibers obtained by the present invention have utterly the same chemical fundamental characteristics as the crosslinked monovinyl polymer resins which have been widely used as precursor of functional resins and moreover they have markedly great surface area due to thier porous structure in addition to said advantages perovided by their fibrous form. Thus, they are much preferred materials for obtaining various functions.

Furthermore, the present fibers have the following merits in production thereof.

1. Scope of selection of the monovinyl monomers used is wide.

2. Crosslinking degree of the crosslinked monovinyl polymer can be controlled in good reproducibility depending on the amount of the polyvinyl monomer used.

3. Porosity of the crosslinked monovinyl polymer fibers can be optionally changed by changing the degree of impregnation of the mixed monomer liquid in the substrate fibers.

4. Shape of the crosslinked monovinyl polymer fibers such as diameter, shape of cross section, length, etc. can be freely changed by changing those of the substrate fibers used.

The method of the present invention will be explained in detail.

The monovinyl monomers used in the present invention are those which may be radical polymerized and which have a boiling point of at least 30° C, preferably higher than 50 ° C under atmospheric pressure. These monovinyl monomers include those in extremely wide scope and typical examples are as follows: acrylic acid, methacrylic acid, itaconic acid, maleic acid, ethylenesulfonic acid, styrenesulfonic acid, 2-acrylamide-2-methylpropylsulfonic acid, sulfopropyl methacrylate, sulfoethyl acrylate, vinylphosphonic acid, vinylpyridine, vinyl substituted alkyl pyridines, vinylbenzylamines, 2-hydroxy-3-methacryloyloxypropylamines, 3-acrylamidepropylamines, vinylbenzyltrialkylammonium chloride, vinylpyridinium salts, styrene, methyltoluene, vinylbenzyl chloride, chloromethylvinyl ether, chloroethylvinyl ether, allyl chloride, methyl acrylate, ethyl acrylate, methyl methacrylate, ethyl methacrylate, acrylamide, methacrylamide, N-acrylamide-morpholine, acrylonitrile, acrolein, vinyl chloride, vinyl bromide, vinyl acetate, vinylpyrrolidone, etc.

These monovinyl monomers may be used alone or in admixture of two or more.

The polyvinyl monomers used in the present invention include divinylbenzene, divnyltoluene, methylenebisacrylamide, ethylenebisacrylamide, methylenebismethacrylamide, ethylenebismethacrylamide, ethylene bisacrylate, ethylene trisacrylate, ethylene bismethacrylate, ethylene trismethacrylate, divinyl sulfone, divinyl ether, diallyl phthalate, etc. These polyvinyl monomers must be chosen taking into consideration the copolymerizability, compatibility, etc. with said monovinyl monomers and from these viewpoints especially divinylbenzene, methylenebisacrylamide, methylenebismethacrylamide and ethylenebismethacrylamide and preferably used. The amount of polyvinyl monomers used determines the degree of crosslinking and may be optionally chosen depending on the objective use, but generally they are used in an amount of 0.3 – 40% by weight of the total amount of the monomers.

The polymerization initiators used in the present invention are preferably radical polymerization initiators which are inactive at the temperature at which the mixed monomer liquid is impregnated in the substrate fibers, preferably room temperature and are activated by heating to a temperature of not more than the boiling point of the vinyl monomers and which are soluble in the mixed monomer liquid. Specific examples of such polymerization initiators are acetylcyclohexanesulfonyl peroxide, dicyclohexylperoxydicarbonate, bis(2-ethylhexyl)peroxydicarbonate, di-isopropylperoxydicarbonate, bis(2,4-dichlorobenzyl)peroxide, di-lauroyl peroxide, di-propionyl peroxide, dibenzoyl peroxide, tertiary butylhydroperoxide, tertiary butylcumyl peroxide, 2,2'-azobis(2,4-dimethyl valeronitrile), azobisisobutyronitrile, di-tertiarybutyl peroxide, etc. These polymerization initiators may be used alone or in admixture of two or more.

Furthermore, if necessary, a swelling regulator and a diluent may be added to the mixed monomer liquid.

Said swelling regulator controls the degree of swelling in case the substrate fibers cannot be sufficiently swollen only by the monovinyl monomers, polyvinyl monomers and polymerization initiators or in case the swelling action is great and the substrate fibers are dissolved or are in the nearly dissolved state. As such swelling regulator, solvents for the substrate fibers are used in the former case and non-solvents for the substrate fibers are used in the latter case and moreover they must be compatible with the mixed monomer liquid. The diluent is added to the mixed monomer liquid when extremely highly porous crosslinked monovinyl polymer fibers are desired and by using thus diluted liquid the distribution of the crosslinked monovinyl polymer formed in the substrate fibers is made thin to obtain more porous crosslinked monovinyl polymer fibers. Generally, the diluent alone does not dissolve the substrate fibers, and a solvent having a suitable swelling action is used. When the swelling regulator is used, this also acts as the diluent.

The substrate fibers in which the mixed monomer liquid is impregnated are required firstly to be organic fibers which swell with the mixed monomer liquid at at least the polymerization temperature, but are not dissolved in the liquid and secondly to be organic fibers which can be relatively easily decomposed or dissolved and removed after polymerization of the monomers in the substrate fibers.

More specifically, for the first requirement, it is necessary to employ the substrate fibers which can be swollen by 30 – 500 volume % with the mixed monomer liquid at at least the polymerization temperature of the monomers. When the degree of swelling is less than 30 volume %, absorption of the mixed monomer liquid impregnated is insufficient and polymerization of the monomers outside the substrate fibers is apt to occur and moreover distribution of the polymer produced in the substrate fibers tends to become unhomogeneous. On the other hand, when the degree of swelling is more than 500 volume %, the substrate fibers are in the nearly dissolved state to cause strong adhesion of the substrate fibers themselves and it becomes impossible to separate them after polymerizaation. The degree of swelling for preferred substrate fibers is within the range of 50 – 400 volume % and the substrate fibers having such degree of swelling can be optionally chosen in view of the combination with the mixed monomer liquid. The degree of swelling can be measured as follows: the fibers which are cut in short length are introduced into the large excess mixed monomer liquid to allow the liquid to be absorbed in the fibers and the monomers are polymerized at a given temperature. Thereafter, the increase ratio of the volume of the fibers after the polymerization to the volume before the absorption of the mixed monomer liquid is obtained by observation under a microscope. The degree of swelling is expressed by the thus obtained volume increase ratio.

The substrate fibers which meet the second requirement are preferably those for which there are excellent solvents or decomposing agents.

Among them, those to which the method of dissolving and removing them with solvents (referred to as dissolving method hereinafter) can be applied include polyamide fibers such as polycapramide, polyhexamethylene adipamide, etc., cellulose diacetate fibers, cellulose triacetate fibers, polyurethane fibers, polyacrylonitrile fibers, modacrylic fibers, etc. and those to which the method of decomposing and removing them with decomposing agents (referred to as decomposing method hereinafter) can be applied include polyester fibers, polyamide fibers, polyurethane fibers, cellulose diacetate fibers, cellulose triacetate fibers, nitrocellulose fibers, after-acetylated rayon, etc.

Of these fibers, cellulose diacetate fibers and cellulose triacetate fibers have preferred swelling ability with the mixed monomer liquids of wide composition, moreover exhibit substantially no shrinkage even when they absorb a relatively large amount of the mixed monomer liquid and beside they can be easily removed by dissolving or decomposing after polymerization. Thus, these fibers are especially preferred.

The steps from impregnation of the mixed monomer liquid in the substrate fibers until polymerization of the monomers can be carried out mainly by the following two methods.

The first method comprises dipping the substrate fibers in the mixed monomer liquid to sufficiently swell the fibers, then removing the mixed monomer liquid which adheres to the outside of the substrate fibers and thereafter placing the fibers in an atmosphere of a temperature at which the monomers can be polymerized. the second method comprises applying to the substrate fibers the mixed monomer liquid in an amount within the range capable of being absorbed by the substrate fibers, then placing them in a heated atmosphere to make complete permeation of the mixed monomer liquid in the substrate fibers and thereafter initiating the polymerization. Especially in the second method, it is also possible to absorb the mixed monomer liquid in the fibers during the induction period before initiation of the polymerization by placing the fibers in an atmosphere of a temperature at which polymerization can be accomplished, directly after the mixed monomer liquid has been applied to the fibers.

The amount of the mixed monomer liquid impregnated in the substrate fibers may vary depending on the desired porosity, but may be within the range of 50 – 400% by weight.

Polymerization of the monomers may be carried out in a heated atmosphere which is not higher than the boiling point of the mixed monomer liquid and in which volatilization or diffusion of the components of the mixed monomer liquid does not occur. Preferably, the mixed monomer liquid is directly heated in an aqueous medium of warm water or warm water containing inorganic salts such as Glauber's salt in case the mixed monomer liquid comprises only water insoluble components and contains no water soluble components. On the other hand, in case the mixed monomer liquid contains water soluble components (naturally including the case when the mixed monomer liquid contains only water insoluble component), it is packed in a glass container or a polyolefin film bag to prevent the liquid from directly contacting with a heated aqueous medium and is indirectly heated with warm water, steam, hot air, etc.

Generally, the first method is suitable when the substrate fibers are well swollen with the mixed monomer liquid of around room temperature. However, when the degree of swelling is low at around room temperature, it is necessary to use a mixed monomer liquid heated to a temperature at which the polymerization does not substantially occur, but the swelling is accelerated, with use of a polymerization initiator of high activating temperature. This method is effective especially when the substrate fibers used are in the form of monofilament or filament bundle of fine denier.

The second method can be preferably applied to the substrate fibers in the various form of filaments, staple fibers, tow, cut fibers, cloth, yarns, etc. and moreover mass production is possible according to this method. In this method, in order to completely and homogeneously absorb in the substrate fibers the mixed monomer liquid between the fibers, it is preferred to avoid the use of the fibers in bulky form or to compress them when the mixed monomer liquid is absorbed therein. From these viewpoints, to use the substrate fibers in the form of non-crimped tow or filament bundle is much preferred because these fibers are high in the rate of fibers being existed and furthermore complete and homogeneous absorption of the mixed monomer liquid can be easily attained due to capillary phenomenon.

Moreover, in case the substrate fibers in these methods highly shrink due to absorption of the mixed monomer liquid, there occur the problems such as difficulty in handling of the fibers after polymerization and so preferably absorption and polymerization of the mixed monomer liquid are carried out while maintaining the substrate fibers under such tension as not causing shrinkage of more than 50% of the original length.

Thus, if the substrate fibers bond to each other by the polymer formed outside the fibers after polymerization of the monomers in the substrate fibers, it is necessary to eliminate the bonding between the substrate fibers prior to the removal of the substrate fibers from crosslinked polymer-containing substrate fibers. When the substrate fibers used are in the form of cloth, tow, etc., the elimination of the bonding is carried out by crumpling them, e.g., by passing them between a pair of pressing rolls. When a final product of less than several mm is desired, the crosslinked polymer-containing substrate fibers after polymerization are once cut to a given length and thereafter they are treated by mixer, pulp beater, etc.

Removal of the substrate fibers from crosslinked monovinyl polymer-containing substrate fibers is carried out in the following manner.

Removal of the substrate fibers by the dissolving method can be carried out by Soxhlet extractor and the like using solvents for the substrate fibers, for example, preferably formic acid for polyamide fibers, acetone or methyl acetate for cellulose diacetate fibers, methylene chloride or ethane dichloride for cellulose triacetate fibers, dimethylformamide or dimethylacetamide for polyurethane fibers, dimethylformamide or dimethylacetamide for polyacrylonitrile fibers, acetone or dimethylformamide for modacrylic fibers. In the case of using solvents of relatively high boiling point, it is also possible to dip the fibers directly in a bath containing large excess solvent which is preferably warmed to dissolve and remove the substrate fibers.

For removal of the substrate fibers by the decomposing method, mineral acids, especially sulfuric acid, an aqueous sulfuric acid solution, etc. may be preferably used as decomposing agent for polyester fibers, cellulose diacetate fibers, cellulose triacetate fibers, afteracetylated fibers, polyamide fibers, polyurethane fibers, nitrocellulose fibers, etc. Sulfuric acid is used preferably as a 20 – 90% aqueous solution, preferably heated to 60° – 100° C. Aqueous alkali solution such as sodium hydroxide may also be used for polyurethane fibers or polyester fibers.

When the decomposing method is employed, it is also necessary to consider chemical changes of the crosslinked monovinyl polymer formed in the substrate fibers caused by the decomposing agent and the decomposing agents have to be optionally chosen depending on the kinds of the crosslinked monovinyl polymers and the substrate fibers.

Furthermore, in case of using such monovinyl monomers as acrylamide, alkyl esters of acrylic acid, etc. which have groups which are liable to be modified with decomposing agents for the substrate fibers, the conditions should be set, taking the modification into consideration.

On the other hand, it is also possible to directly obtain modified crosslinked vinyl polymer fibers simultaneously with decomposition and removal of the substrate fibers by positive utilzation of the chemical changes caused by the decomposing agent for the substrate fibers. For example porous crosslinked nitrated styrene polymer fibers can be directly obtained by forming a styrene copolymer with divinylbenzene in cellulose diacetate fibers and dipping them in a mixture of sulfuric acid and nitric acid in equal weight at 40° – 60° C for several hours to remove cellulose diacetate fibers.

In the case of employing the decomposing method, if necessary, the decomposition product may be extracted with solvents.

The porous fibers thus obtained by the present method have extremely wide selectivity in determination of basic properties such as degree of crosslinking, porosity, diameter, etc. and moreover are wide in scope of selection of the starting monovinyl monomers. Therefore, these porous fibers are markedly effective porous fibers to which functions have been directly imparted or to which functionalities are to be further imparted.

For example, ion exchange fibers of various types can be obtained by giving ion exchangeability to the porous fibers produced by the present invention. These ion exchange fibers can be produced by the methods which are employed for obtaining the ordinary ion exchange resins in which crosslinked monovinyl polymers are main component. Furthermore, known method per se can also be employed for producing various functional fibers by imparting other functions.

The following examples illustrate the present invention. All parts in the examples are by weight.

EXAMPLE 1

A mixed monomer liquid comprising 90 parts of ethyl methacrylate, 15 parts of divinylbenzene and 1.0 part of azobisisobutyronitrile was prepared and this was kept at 20° – 22° C.

Separately, cellulose diacetate filament yarns having a monofilament size of 4.1 deniers were used as substrate fibers in the form of a hank of 180 cm in circumference length and 200 g in winding amount to obtain substrate fibers.

This hank was dipped in said mixed monomer liquid and was squeezed by sponge roll to allow 240 g (120% owf) of the mixed monomer liquid to impregnate to the hank and then both ends of the hank were fixed by metallic rods and the hank was dipped in a saturated aqueous solution of Glauber's salt kept at 70° C.

After dipping for 1 - 2 minutes, the mixed monomer liquid between the fibers was abosrbed in the fibers and polymerization began with generation of nitrogen gas caused by decomposition of azobisisobutyronitrile and was completed after 3 hours.

After termination of the polymerization, the polymer-containing cellulose diacetate fibers lightly bonded to each other to the extent that they could be easily separated by crumpling with hands. They were cut to 1.5 mm in length by a guillotine cutter and were treated by a mixer for business use together with water in an amount of 50 times the weight of the fibers to remove the bonding between the polymer-containing cellulose diacetate fibers. Thereafter, water was removed by a net of 120 meshes to recover the polymer-containing cellulose diacetate fibers.

The whole of thus recovered polymer-containing cellulose diacetate fibers was dipped in 10 l of 5 weight % aqueous sulfuric acid solution at 70° C for 4 hours to decompose cellulose diacetate fibers and were recovered on a net of 120 meshes and washed with current water to remove decomposition product of the cellulose diacetate fibers and sulfuric acid. Furthermore, the residue was dehydrated and then dried under reduced pressure at 50° C to obtain 224 g of fibers comprising polyethyl methacrylate crosslinked with divinylbenzene. Thus obtained crosslinked polymer fibers had a diameter of 45 $\mu$ and a length of 100 - 1500 $\mu$. Comparison of said crosslinked polymer fibers with the polymer-containing substrate fibers before removal of the substrate fibers by observation of microphotographs of $\times$ 100 shows no significant difference in the side and section of the fibers. However, measurement of surface area by the BET method resulted in 29.7 m$^2$/g which shows that they were clearly porous as compared with the polymer-containing substrate fibers having a surface area of 0.31 m$^2$/g.

EXAMPLE 2

Example 1 was repeated except that cellulose triacetate filament yarns having a monofilament size of 10.2 deniers as a hank of 180 cm circumference length and a winding amount of 200 g were used as the substrate fibers and amount of the mixed monomer liquid impregnating to the fibers was 245 g. As the result, 220 g of fibers of 49 $\mu$ in diameter and 100 - 1500 $\mu$ in length which comprised polyethyl methacrylate crosslinked with divinylbenzene were obtained.

EXAMPLE 3

In the same manner as in Example 1, 252 g of a mixed monomer liquid consisting of 90 parts of methyl methacrylate, 10 parts of divinylbenzene and 1.0 part of 2,2'-azobis(2,4-dimethylvaleronitrile) at 20° C was allowed to impregnate to a hank of cellulose triacetate filament yarns having a monofilament size of 3.1 deniers (weight of the hank 200 g and circumference length 180 cm) as substrate fibers. This hank was dipped in a saturated aqueous solution of Glauber's salt kept at 58° C for 2 hours to polymerize the monomers which were abosrbed in the fibers. 452 g of thus obtained polymer-containing cellulose triacetate fibers were repeatedly passed between rollers having hard rubber surface to eliminate the bonding between the fibers. Thereafter, the cellulose triacetate fibers were dissolved out with dichloromethane as a solvent by Soxhlet extractor to obtain 240 g of porous fibers which comprised polymethyl methacrylate crosslinked with divinylbenzene and which had a diameter of 42 $\mu$ and a length of 1500 $\mu$.

EXAMPLE 4

A tow of cellulose diacetate fibers having a monofilament size of 3.3 deniers and a total size of 45000 deniers as substrate fibers was dipped in a mixed monomer liquid consisting of 98.8 parts of styrene, 2.5 parts of divinylbenzene and 1.2 parts of benzoyl peroxide at 28° C. Then, this tow was squeezed by sponge roll to remove excess mixed monomer liquid. Thereafter, the hank was continuously introduced into a J-box containing hot water adjusted to 90° C, stayed therein for 2 hours and thereafter taken out from another end of the J-box. Amount of the mixed monomer liquid consumed was 1.02 times the weight of the substrate fibers and dry weight of the fibers after polymerization was 2.01 times that of the substrate fibers. The tow-like intermediate taken out had light bonding between the substrate fibers and this was continuously cut to an average length of 3 mm by a Guillotin cutter. The bonding between the substrate fibers was physically eliminated by a disk type refiner (beater for pulp manufactured by Kumagaya Kikai K.K.) and then the fibers were treated in 50 weight % aqueous solution of sulfuric acid at 70° C for 4 hours to decompose the cellulose diacetate fibers, washed with water and dried to obtain fibers which comprised polystyrene crosslinked with divinylbenzene and which had a diameter of 41 $\mu$ and a length of 100 - 1500 $\mu$. The surface area of said fibers was 1.32 m$^2$/g meausred by nitrogen adsorbing method in accordance with BET method.

EXAMPLE 5

Example 4 was repeated except that to the mixed monomer liquid was added equal weight of toluene to dilute it to 2 times. Exhaustion amount (including toluene) of the mixed monomer liquid was 1.05 times the weight of the fibers and dry weight (drying under reduced pressure at 80° C after washing with methanol) after polymerization was 1.46 times the weight of the substrate fibers. In the same manner as in Example 4, the cellulose diacetate fibers were decomposed and removed and the residue was washed with water and dried to obtain porous fibers which comprised polystyrene crosslinked with divinylbenzene and which had a diameter of 43 $\mu$ and a length of 100 - 1500 $\mu$.

The surface area of the resultant fibers was 107.7 m$^2$/g measured by nitrogen adsorbing method according to BET method.

EXAMPLE 6

A mixed monomer liquid consisting of 80 parts of vinylbenzyl chloride (ortho- and para-mixture), 15 parts of divinylbenzene, 5 parts of styrene, 1.0 part of azobisisobutyronitrile and 0.5 part of benzoyl peroxide at 20° C was prepared. 210 g of said mixed monomer liquid was allowed to homogeneously impregnate to a hank of cellulose triacetate filament yarns having a monofilament size of 10.2 deniers which had a circumference length of 180 cm and a winding amount of 200 g in the same manner as in Example 1. Then, said hank was dipped in water at 70° C for 2 hours and then in water at 90° C for 4 hours to polymerize the monomers absorbed in the fibers. Thereafter, in the same manner as in Example 1, 195 g of porous fibers which comprised polyvinylbenzyl chloride crosslinked with divinylbenzene and which had a diameter of 41 $\mu$ and a length of 100 - 1500 $\mu$ were obtained.

EXAMPLE 7

A hank (circumference length 180 cm and winding amount 190 g) of polyethylene terephthalate fibers having a monofilament size of 3 deniers was dipped in a mixed monomer liquid consisting of 70 parts of styrene, 30 parts of divinylbenzene, 0.8 part of di-tertiary butyl peroxide and 50 parts of 1,1,2,2-tetrachloroethane at 15° C. Then, said hank was squeezed with a sponge roll to allow 223 g of the mixed monomer liquid to impregnate to the hank. Thereafter, the hank was placed in a stainless steel pressure resistant container having a content volume of 1200 cc together with 800 cc of saturated brine at 100° C and was maintained therein at 120° C for 4 hours. Thereafter, the content was taken out of find that the monomers were absorbed in the substrate fibers and were polymerized. This was then cut to a length of 3 mm by a guillotine cutter. The bonding between the substrate fibers was eliminated by a disk type refiner. Thereafter, they were dipped in 80 weight % aqueous solution of sulfuric acid at 60° C for 48 hours to decompose the polyethylene terephthalate fibers as the substrate fibers. The residue was washed with carbon tetrachloride, methanol, 1N sodium hydroxide and water in this order to obtain porous fibers which comprised polystyrene crosslinked with divinylbenzene and which had a dry weight of 155 g, a diameter of 38 $\mu$ and a length of about 3 mm.

EXAMPLE 8

75 g of a mixed monomer liquid consisting of 60 parts of acrylamide, 40 parts of methylenebisacrylamide, 2.0 parts of 2,2'-azo-bis(2,4-dimethylvaleronitrile) and 30 parts of methyl acetate at 25° C was homogeneously impregnated in 100 g of short fiber aggregate of cellulose diacetate fibers having a monofilament size of 1.5 deniers and a length of 2 mm. This was packed in a bag of polyethylene film and this closed bag was dipped in a water bath at 50° C for 24 hours to obtain fibrous mass in which the monomers were absorbed in the substrate fibers and polymerized therein. Said mass was vigorously agitated for 30 minutes by a high speed mixer together with water to eliminate the bonding between the substrate fibers. Thereafter, it was dried and then the cellulose diacetate fibers were dissolved and removed with acetone by Soxhlet extractor to obtain 71 g in dry weight of porous fibers which comprised polyacrylamide crosslinked with methylenebisacrylamide and which had a diameter of 36 $\mu$ and a length of 2.4 mm.

EXAMPLE 9

95 g of cellulose triacetate fibers having a monofilament size of 10.2 deniers and a length of 2 mm were packed in a glass column of 10 cm in inside diameter and 50 cm in length (the bottom was provided with a stainless steel wire netting of 80 meshes). 500 cc of a mixed monomer liquid containing 70 parts of acrylic acid, 20 parts of itaconic acid, 10 parts of methylenebisacrylamide, 2.0 parts of azobisisobutyronitrile and 5.0 parts of 30% ammonia water at 20° C was poured into said glass column from above and immediately dried nitrogen gas was fed thereinto under a pressure of 1 kg/cm² to discharge the mixed monomer liquid between the fibers from the column, during which the cellulose triacetate fibers absorbed the mixed monomer liquid to result in increase in the weight to 370 g. This was transferred into a bag of polypropylene film and this closed bag was introduced into warm water of 75° C to polymerize the monomers for 90 minutes. Thereafter, the content was dipped in excess ammonia water to convert all carboxyl groups into ammonia salt to make the fibers soft and easily separable. They were agitated together with excess water for 30 minutes by a high speed mixer, whereby the bonding between the substrate fibers could be completely eliminated. Furthermore, they were neutralized with 2N hydrochloric acid, washed with water and dried and then the cellulose triacetate fibers were dissolved and removed with dichloromethane to obtain porous fibers which comprised acrylic acid-itaconic acid copolymer crosslinked with methylenebisacrylamide and which had a diameter of 55 $\mu$ and a length of 2.1 mm. The fibers obtained had a cation exchange capcity of 10.5 milli equivalent/g.

EXAMPLE 10

In the same manner as in Example 9, a mixed monomer liquid consisting of 80 parts of methacrylic acid, 20 parts of divinylbenzene and 1.3 parts of azobisisobutyronitrile at 20° C was applied to 95 g of polycaproamide fibers having a monofilament size of 1.5 denier and a length of 1.5 mm (weight of the polycaproamide fibers absorbing the mixed monomer liquid was 320 g) and polymerization of the monomers and elimination of bonding between the fibers were conducted. Thereafter, the fibers were dipped in 80 weight % aqueous solution of sulfuric acid at 40° C for 3 days to remove the polycapramide fibers to obtain 220 g of porous fibers comprising polymethacrylic acid crosslinked with divinylbenzene. Said fibers had a cation exchange capacity of 9.4 milli equivalent/g.

EXAMPLE 11

50 g of the porous fibers obtained in Example 1, 200 g of xylene and 500 g of pentaethylenehexamine were put in a 1 l flask and were treated for 6 hours under reflux. The reaction product was filtered off and washed with methanol, 2N hydrochloric acid and water in this order. Then, this was made OH type with 2N sodium hydroxide and washed with deionized water until sodium ion was lost. Thus obtained fibers had a hydrochloric acid neutralizing capacity of 6.7 milli equivalent/g of dry weight.

Furthermore, 50 g of the fibers obtained in Example 1 and 500 g of ethylenediamine were put in a 1 l flask and they were reacted at 100° C for 5 hours. The reaction product was subjected to the same conditioning as above. The resultant fibers had a hydrochloric acid neutralizing capcity of 6.2 milliequivalent/g. Furthermore, these fibers had a capacity of uptaking 2.05 millmol/g of copper ion from 0.001 mol/l of aqueous solution of copper sulfate.

EXAMPLE 12

50 g of the fibers obtained in Example 4 together with an alcholic solution containing 200 g of potassium hydroxide were subjected to reflux treatment for 15 hours in a stainless steel flask. The reaction product was washed with water, then with 2N hydrochloric acid seven times and thereafter with deionized water until chlorine ion was lost. Thus, cation exchange fibers having a sodium hydroxide neutralizing capacity of 9.8 milli equivalent/g were obtained.

EXAMPLE 13

When 100 g of the fibers obtained in Example 5 was put in a flask containing 800 cc of 98% sulfuric acid at 75° C, the temperature of the content was elevated to 87° C due to the heat of reaction. Then, the content was treated for 4 hours keeping the temperature at 85° – 90° C, put in a 50% aqueous solution of sulfuric acid cooled to 4° C and diluted with cold water. Thereafter, the fibers were collected by a stainless steel wire netting of 80 meshes. Thus obtained fibers had brown color and had a sodium hydroxide neutralizing capacity of 5.0 milliequivalent/g and a sodium chloride decomposing capcity of 4.8 milliequivalent/g.

EXAMPLE 14

50 g of benzene was impregnated in 195 g of the fibers obtained in Example 7 to swell the fibers. Then, the fibers were packed in a pipe of 5 cm in inside diameter, into which trimethylamine gas was gradually blown to cause a reaction. During the reaction, the temperature of the content was 40° – 45° C and contact time with the gas was 6.5 hours. Thereafter, the amine was neutralized with 1N hydrochloric acid and then the content was washed with water and methanol to obtain strongly basic anion exchange fibers, which were dry OH type and had a hydrochloric acid neutralizing capacity of 4.4 milliequivalent/g and a sodium chloride decomposing capacity of 3.9 milliequivalent/g.

What is claimed is:

1. A method for producing porous cross-linked monovinyl polymer fibers, which comprises: impregnating substrate fibers capable of being swollen by 30–500 volume % with a mixed monomer liquid comprising at least one monovinyl monomer and at least one polyvinyl monomer which liquid monomer mixture contains a polymerization initiator such that said liquid monomer mixture is homogenously absorbed by the swollen substrate; polymerizing the monomer mixture absorbed in the fibers; and then removing the substrate fibers from the polymerized monomer mixture.

2. The method according to claim 1, wherein said monovinyl monomer is selcted from the group consisting of acrylic acid, methacrylic acid, itaconic acid, maleic acid, ethylenesulfonic acid, styrenesulfonic acid, 2-acrylamide-2-methylpropylsulfonic acid, vinylpyridine, vinylpyrrolidone, acrylamide, methacrylamide, N-acrylamidemorpholine, styrene, vinylbenzyl chloride, methyl acrylate, ethyl acrylate, methyl methacrylate, ethyl methacrylate and vinyl acetate.

3. The method according to claim 1, wherein said polyvinyl monomer is selected from the group consisting of divinylbenzene, methylenebisacrylamide, methylenebismethacrylamide, and ethylenebismethacrylate.

4. The method according to claim 1, wherein the amount of the polyvinyl monomer is 0.3 – 40% by weight of the total amount of the monomers.

5. The method according to claim 1, wherein the mixed monomer liquid contains a swelling regulator.

6. The method according to claim 1, wherein the substrate fibers are at least one fibers selected from the group consisting of cellulose diacetate fibers, cellulose triacetate fibers, polyamide fibers and polyester fibers.

7. The method according to claim 1, wherein 50 – 400% by weight of the mixed monomer liquid is impregnated in the substrate fibers.

8. The method according to claim 1, wherein the mixed monomer liquid containing no water soluble component is impregnated and absorbed in the substrate fibers and then the monomers are polymerized by direct heating in an aqueous medium.

9. The method according to claim 1, wherein the mixed monomer liquid containing at least water soluble component is impregnated and absorbed in the substrate fibers and then the monomers are polymerized by indirect heating without directly contacting the fibers with heated aqueous medium.

10. The method according to claim 1, wherein the substrate fibers are removed with a solvent for said fibers.

11. The method according to claim 1, wherein the substrate fibers are removed with a decomposing agent for said fibers.

12. Porous fibers obtained according to the method of claim 1.

13. A process according to claim 1, wherein said monomer mixture is removed from the surface of said substrate fibers before said monomer mixture absorbed in the fibers is polymerized.

* * * * *